(12) United States Patent
Jain

(10) Patent No.: US 11,488,620 B2
(45) Date of Patent: Nov. 1, 2022

(54) FAST PLAYBACK IN MEDIA FILES WITH REDUCED IMPACT TO SPEECH QUALITY

(71) Applicant: International Business Machines Corporation, Armonk, NY (US)

(72) Inventor: Deepa Jain, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 16/438,657

(22) Filed: Jun. 12, 2019

(65) Prior Publication Data

US 2022/0068295 A1 Mar. 3, 2022

Related U.S. Application Data

(62) Division of application No. 15/609,441, filed on May 31, 2017, now Pat. No. 10,629,223.

(51) Int. Cl.

| *G10L 21/043* | (2013.01) |
| *G11B 27/00* | (2006.01) |
| *G11B 27/10* | (2006.01) |
| *G10L 15/04* | (2013.01) |
| *H04N 5/783* | (2006.01) |
| *H04N 9/82* | (2006.01) |
| *G10L 21/055* | (2013.01) |
| *G10L 15/02* | (2006.01) |
| *G10L 21/057* | (2013.01) |

(52) U.S. Cl.
CPC ............ *G10L 21/043* (2013.01); *G10L 15/04* (2013.01); *G11B 27/005* (2013.01); *G11B 27/10* (2013.01); *H04N 5/783* (2013.01); *H04N 9/8205* (2013.01); *G10L 21/055* (2013.01); *G10L 21/057* (2013.01); *G10L 2015/025* (2013.01)

(58) Field of Classification Search
CPC ..... G10L 21/043; G10L 15/04; G10L 21/055; G10L 21/057; G10L 2015/025; G11B 27/005; G11B 27/10; H04N 5/783; H04N 9/8205
USPC ........ 386/240, 241, 343; 704/210, 225, 504, 704/205; 348/14, 12
See application file for complete search history.

(56) References Cited

U.S. PATENT DOCUMENTS

| 5,828,994 | A | 10/1998 | Covell |
| 6,490,553 | B2 | 12/2002 | Van Thong |
| 7,366,659 | B2 | 4/2008 | Etter |

(Continued)

OTHER PUBLICATIONS

Lewis, "How to Use Truncate Silence and Sound Smarter with Audacity—TAP70", http://theaudacitytopodcast.com/tap070-how-to-use-truncate-silence-and-sound-smarter-with-audacity/; 9 pages.

(Continued)

*Primary Examiner* — Thai Q Tran
*Assistant Examiner* — Stephen R Smith
(74) *Attorney, Agent, or Firm* — Christopher M. Pignato; Nicholas L. Cadmus

(57) ABSTRACT

The present invention is a computer program product and method for increasing the playback speed of audio or other media files. The computer program product and method identifies pedagogic media files and adds a flag to the metadata of the media file. The flag represents the number and type of pauses or silent sections in the pedagogic media file. Based on the flag, the computer program product and method may fast forward or remove a portion of the pauses and silent sections to provide a new playback speed.

7 Claims, 17 Drawing Sheets

(56) References Cited

U.S. PATENT DOCUMENTS

| | | | |
|---|---|---|---|
| 7,822,050 B2 * | 10/2010 | DeGrazia | H04M 3/42391 704/207 |
| 9,462,230 B1 | 10/2016 | Agrawal | |
| 10,629,223 B2 | 4/2020 | Jain | |
| 2003/0165327 A1 | 9/2003 | Blair et al. | |
| 2003/0212547 A1 | 11/2003 | Engelke | |
| 2004/0068412 A1 | 4/2004 | Chu | |
| 2006/0293883 A1 | 12/2006 | Endo et al. | |
| 2008/0267224 A1 | 10/2008 | Kapoor | |
| 2011/0161076 A1 | 6/2011 | Davis | |
| 2012/0169837 A1 | 7/2012 | Olofsson | |
| 2013/0051753 A1 * | 2/2013 | Ljolje | H04N 21/6587 386/E5.052 |
| 2015/0332732 A1 * | 11/2015 | Gilson | G11B 27/19 386/240 |
| 2017/0289220 A1 | 10/2017 | Bloch | |
| 2018/0061453 A1 * | 3/2018 | Srinivasan | G11B 27/19 |
| 2018/0295240 A1 | 10/2018 | Dickins | |
| 2018/0338170 A1 | 11/2018 | Stokking | |
| 2018/0350388 A1 | 12/2018 | Jain | |

OTHER PUBLICATIONS

"Remove Silent Gaps & Amplify Audio—Audacity—Linux Mint 6"; https://www.youtube.com/watch?v=_a0sqtmLaNc; 3 pages.

TechSmith Customer Community; "Automatically delete silent sections form audio and video"; https://feedback.techsmith.com/techsmith/topics/automatically_delete_silence_sections_from_audio_and_video-az7gl; 5 pages.

"Truncate Silence" from Audacity Development Manual; http://manualaudacityteam.org/man/truncate_silence.html; 5 pages.

List of IBM Patents or Applications Treated as Related—Appendix P.

Lewis, "How to Use Truncate Silence and Sound Smarter with Audacity—TAP70", http://theaudacitytopodcast.com/ap070-how-to-use-truncate-silence-and-sound-smarter-with-audacity/; 9 pages, Feb. 27, 2012.

"Remove Silent Gaps & Amplify Audio—Audacity—Linux Mint 6"; https://www.youtube.com/watch?v=_a0sqtmLaNc; 3 pages, May 31, 2017.

TechSmith Customer Community; "Automatically delete silent sections form audio and video"; https://feedback.techsmith.com/techsmith/topics/automatically_delete_silence_sections_from_audio_and_video-az7gl; 5 pages, May 31, 2017.

"Truncate Silence" from Audacity Development Manual; http://manualaudacityteam.org/man/truncate_silence.html; 5 pages, May 31, 2017.

U.S. Appl. No. 15/609,441—PDF from Public Pair of parent case, U.S. Appl. No. 15/609,441, filed Jun. 7, 2019.

List of IBM Patents or Applications Treated as Related—Appendix P, dated Jun. 12, 2019.

* cited by examiner

FAST PLAYBACK IN MEDIA FILES WITH REDUCED IMPACT TO SPEECH QUALITY

CROSS-REFERENCE TO RELATED APPLICATION

The present application relates, claims priority to, and is a divisional application of Applicant's co-pending U.S. patent application Ser. No. 15/609,441, filed May 31, 2017, the entire disclosure of which is hereby incorporated by reference.

BACKGROUND

The present invention relates generally to increasing the speed of sound files, and more particularly to increasing the speed of spoken content without compromising the quality of the content.

In pedagogic videos such as Massive Online Open Courses or instructional videos, the professor teaches a class or the instructor demonstrates a process. The main feature of these videos is that instructors talk and explain a field of discipline or demonstrate a skill. The instructors often speak at a slow rate with extended pauses between words or sentences. The reasons for this slow delivery are the following.

First, the instructor has to speak continuously for an extended time, so the instructor needs to catch his or her breath and overcome fatigue and exertion. Next, the speed of instruction delivery is maintained at a slow pace to align with the pace of cognition of average or slow learners. However, the speed cannot be maintained to keep pace with the cognition of fast learners. Finally, many demonstrations utilized by teachers and instructors require extra time to complete. For example, a teacher reciting a formula and simultaneously writing the formula on a blackboard requires additional time. Writing takes much longer than talking, so the teacher or instructor usually adjusts his or her talking speed to sync with his or her writing speed.

When learners are going through the playback, they often play back the videos at higher speeds, such as 1.25×, 1.4×, and 1.5×, to save time and to keep pace with their cognition. Even though this often saves times for the user, there are a few words or some particular sentences that a speaker says quickly. Such words cannot be generalized as they depend on the speaker's pronunciations, the speaker's accent, situations occurring at the time of recording, and changes in the emotions of the speaker, for example. Therefore, the learner fails to understand such words or sentences when played back at higher speeds. So, the learner has to slow down the playback speed, rewind, and listen to the recording again. This wastes time and is annoying to the learner. To avoid this annoyance, the learner has to choose a slower playback speed. For example, if the learner can go through 90% of the lecture at 1.5× speed, but the remaining 10% of the lecture is only comprehensible at 1×, then the learner is forced to playback the complete lecture at 1× speed only. Thus, if a lecture of 60 minutes duration can be played back at 1.5× speed in 40 minutes, the learner will still have to take all 60 minutes of time at the original playback speed. Even for very slow talkers, a playback speed higher than 1.6×-1.75× becomes difficult comprehend due to a much lower sampling rate. Therefore, there is an upper limit to the playback speed whereafter the clarity and comprehension quality is affected.

Therefore, there is a need for a system and method to increase playback speed of a recording while preserving the speech quality of the recording.

SUMMARY

The present invention is a system and method for increasing the playback speed of audio files. The system includes a computer processor having a non-transitory memory containing program code for analyzing an audio wave, calculating a first silent section in the audio wave, wherein the first silent section has a length greater than a minimum short pause length required to distinguish between words. Next, the program code calculates a new playback speed of the first silent section so that a total playback time for the first silent section is equal to the minimum short pause length. The program code detects a second silent section after one or more first silent sections, wherein the second silent section has a length greater than a minimum long pause length required to distinguish between sentences. The program code also calculates a new playback speed of the second silent section so that a total playback time for the second silent section is equal to the minimum long pause length.

In another embodiment, the system includes a computer program product providing increased playback speed of audio files. The computer program includes a computer readable storage medium having program instructions embodied therewith. The computer readable storage medium is not a transitory signal per se, the program instructions are readable by a computer to cause the computer to perform a method comprising the steps of identifying a pedagogic media file, adding a flag to metadata of the pedagogic media file, wherein the flag is representative of pauses in the pedagogic media file, and providing one or more new playback speeds based at least in part on the flag.

A method for increasing the playback speed of audio files, comprising the steps of analyzing an audio wave, isolating a word in an audio wave, isolating each phoneme in the word, analyzing frequencies of the phoneme, retaining a high frequency section of the phoneme, and reducing the duration of a low frequency repeating pattern section of the phoneme. The method also includes the step of reducing the duration of an inter-syllable silence section of the phoneme. The duration of the inter-syllable silence and the low frequency repeating pattern section can be reduced by removing a portion of the inter-syllable silence and the low frequency repeating pattern section. The duration of the inter-syllable silence and the low frequency repeating pattern section can also be reduced through faster playback of a portion of the inter-syllable silence and the low frequency repeating pattern section.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1A:
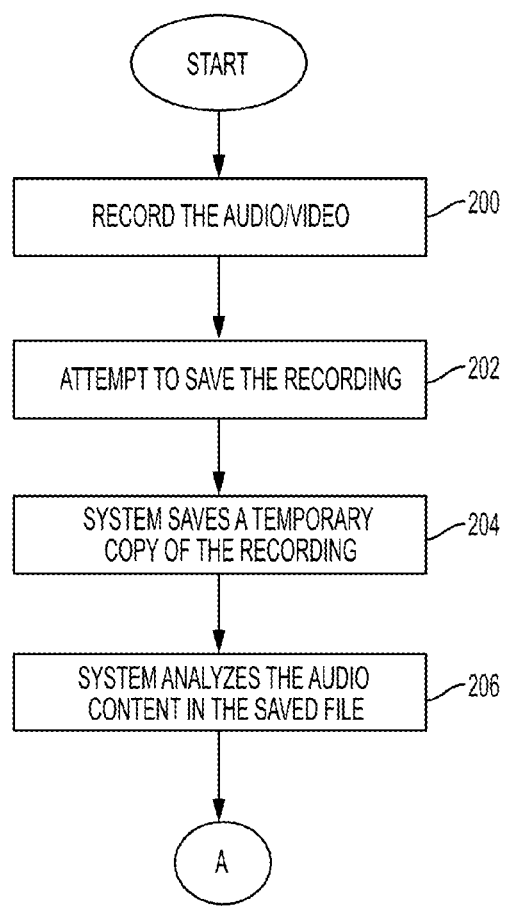
FIG. 1A is a flowchart of a non-limiting illustrative embodiment of a method for media file metadata creation.

Referring to the Figures, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
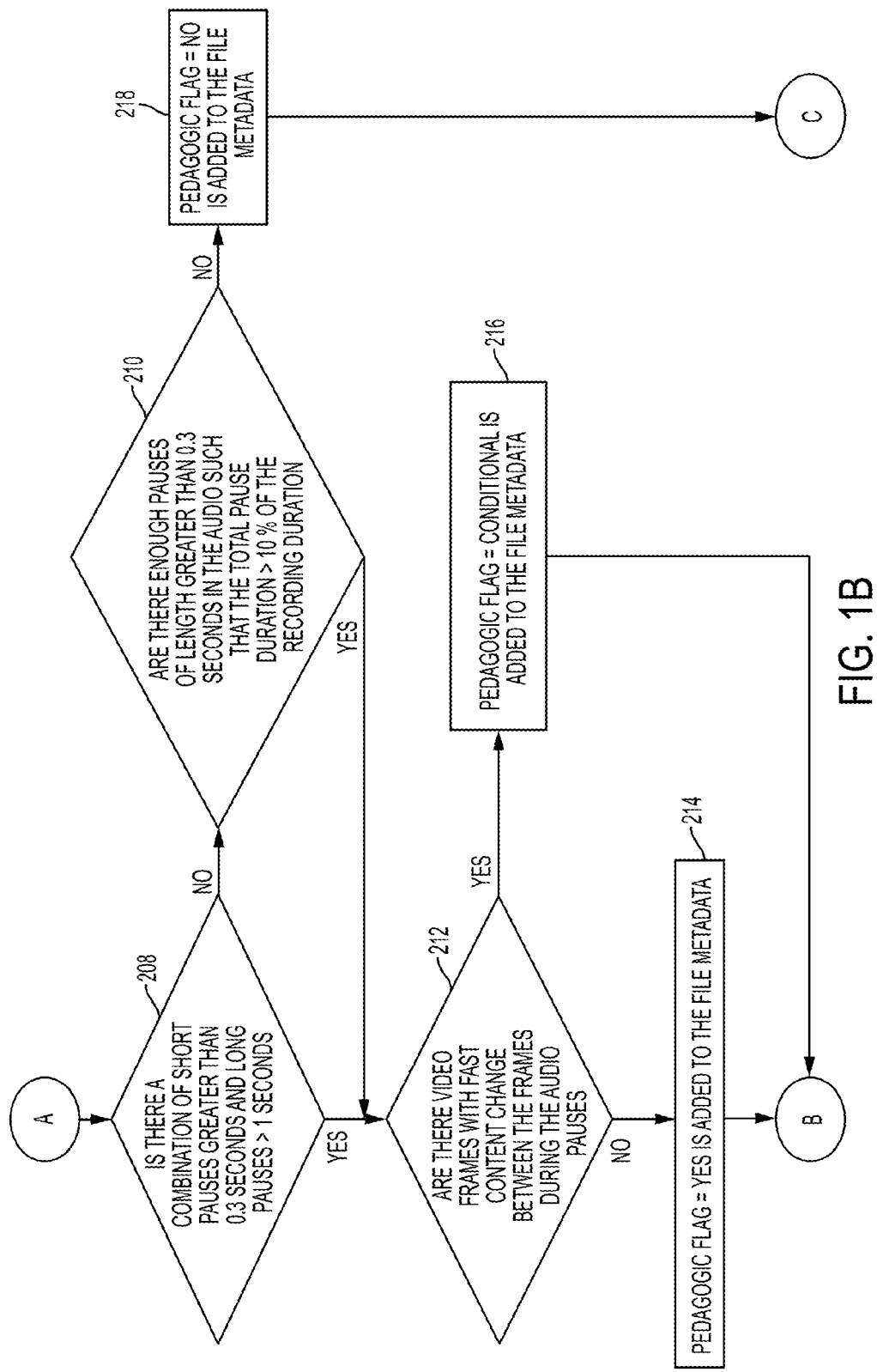
FIG. 1B is a continuation of the flowchart of FIG. 1A of a non-limiting illustrative embodiment of a method for media file metadata creation.
Figure 1C:
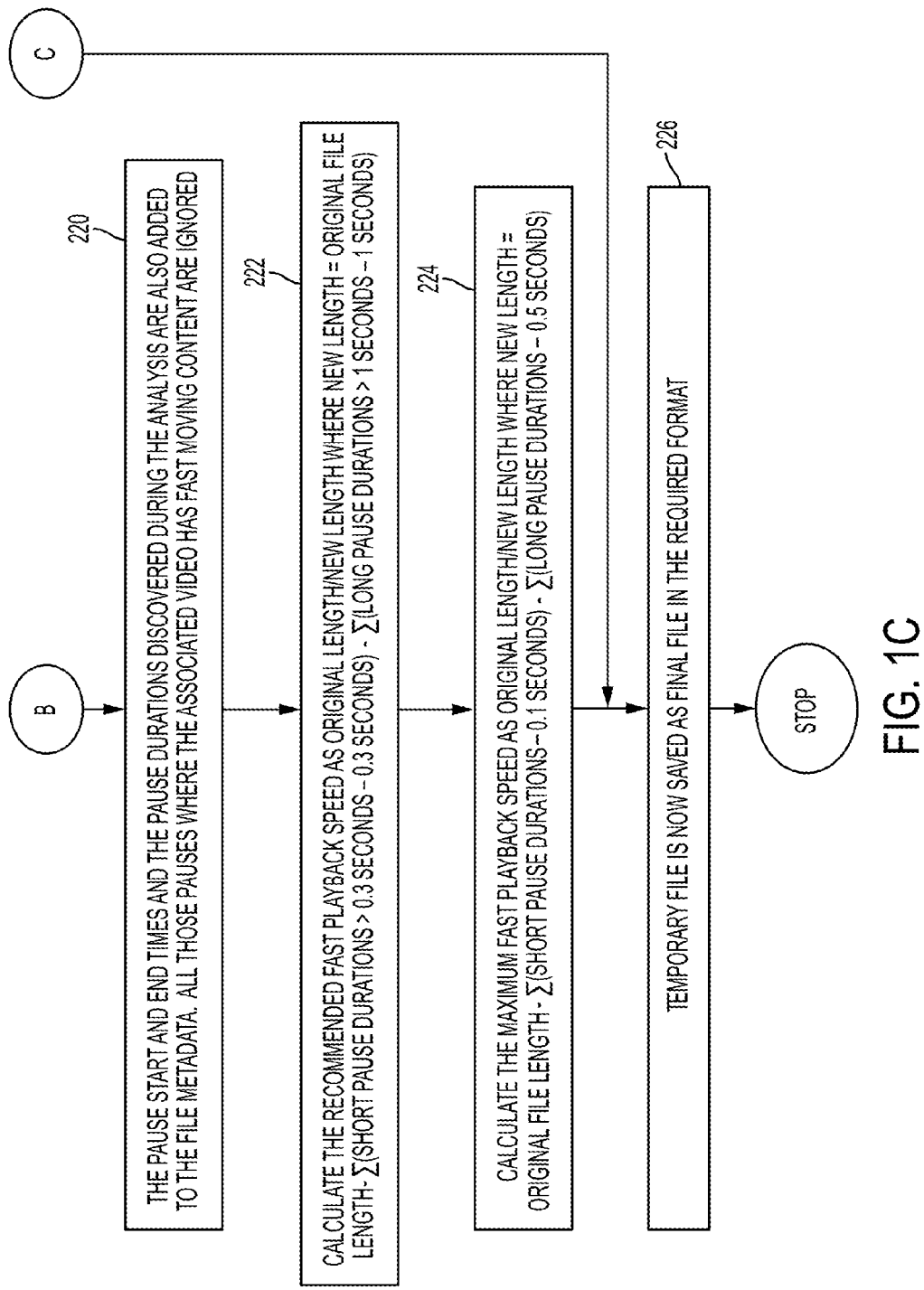
FIG. 1C is a continuation of the flowchart of FIG. 1B of a non-limiting illustrative embodiment of a method for media file metadata creation.

Referring again to the drawings, wherein like reference numerals refer to like parts throughout, there is seen in FIGS. 1A-1C a flowchart of a non-limiting illustrative embodiment of a method for media file metadata creation. At step 200, the audio or video file is recorded by the system. At step 202, the system attempts to save the recording. Thereafter, at step 204, the system saves a temporary copy of the recording. At step 206, the system analyzes the audio content in the saved file. Next, at step 208 shown in FIG. 1B, the system determines whether there is a combination of short pauses greater than 0.3 seconds and long pauses great than 1 second. If there is no combination of short pauses greater than 0.3 seconds and long pauses great than 1 second, the system inquires whether there are enough pauses of length greater than 0.3 seconds in the audio such that the total pause duration is greater than 10% of the recording duration. If there is either, at step 212, the system determines if there are video frames with fast content changes between the frames during the audio pauses. If there are no such fast content changes, a "YES" pedagogic flag is added to the metadata file at step 214. If there are such fast content changes, a "CONDITIONAL" pedagogic flag is added to the file metadata at step 216.

However, back to steps 208 and 210, if there are neither a combination of short pauses greater than 0.3 seconds and long pauses great than 1 second, and not enough pauses of length greater than 0.3 seconds in the audio such that the total pause duration is greater than 10% of the recording duration, the system adds a "NO" pedagogic flag to the metadata file at step 218.

Thereafter, at step 220 shown in FIG. 1C, when the pedagogic flag is "YES" or "CONDITIONAL," the pause start and end times, and the pause durations discovered during the analysis are also added to the file metadata. The system ignores all the pauses where the associated video has fast moving content. Next, at step 222, the system calculates the recommended fast playback speed as the original length divided by new length. The new length is calculated as:

New Length=Original File Length−Σ(short pause durations>0.3 seconds−0.3 seconds)−Σ(long pause durations>1 second−1 second)

Then, at step 224, the system calculates the maximum fast playback as original length divided by the new length, but where the new length is calculated as:

New Length=Original File Length−Σ(short pause durations−0.1 seconds)−Σ(long pause duration−0.5 seconds)

Finally, at step 226, the temporary file is now saved as a final file in the required format. If the pedagogic flag of the metadata is "NO" at step 218, the fast playback speeds are not calculated and the temporary file is saved as a final file at step 226 thereafter.

Figure 2A:
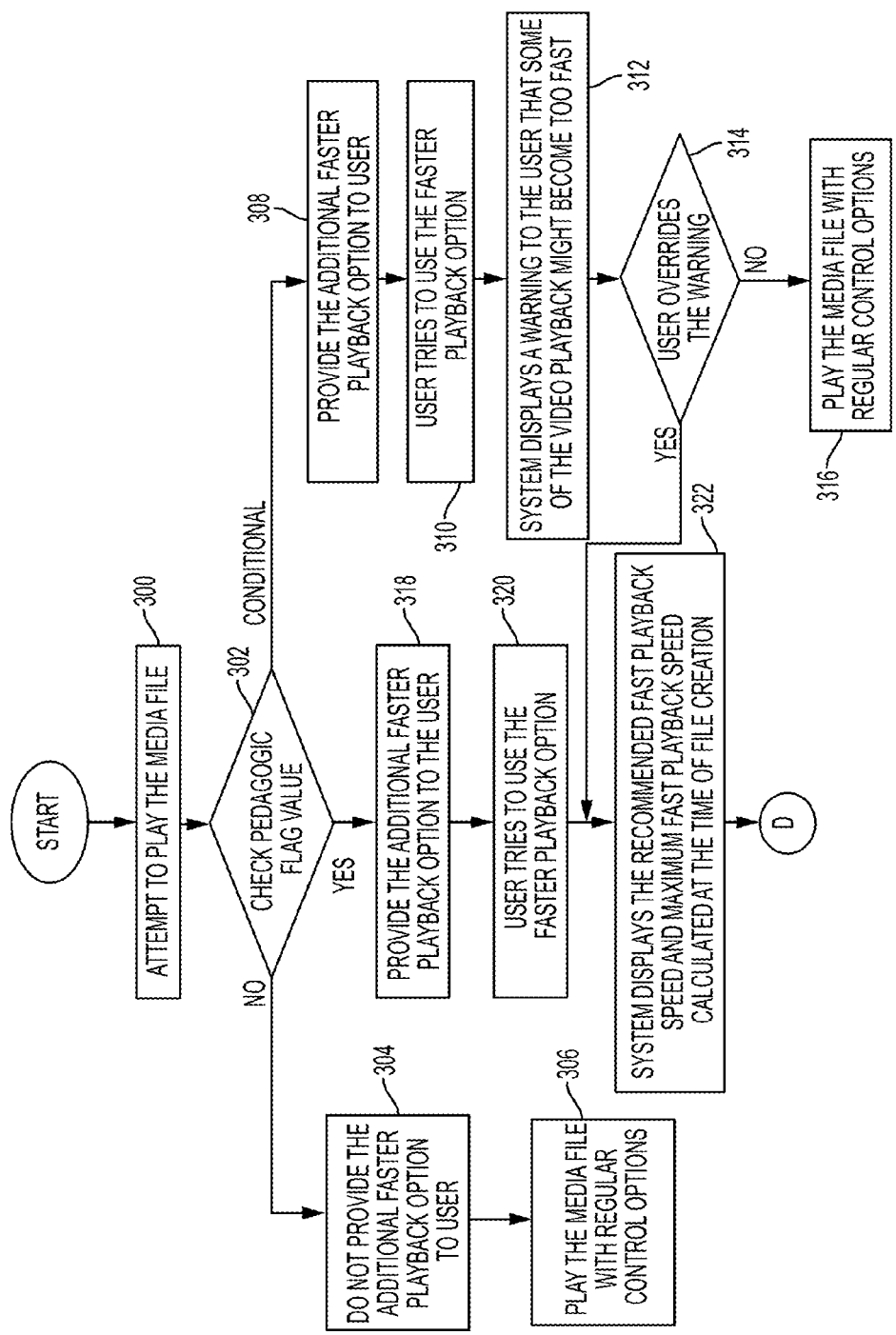
FIG. 2A is a flowchart of a non-limiting illustrative embodiment of a method for fast playback.
Figure 2B:
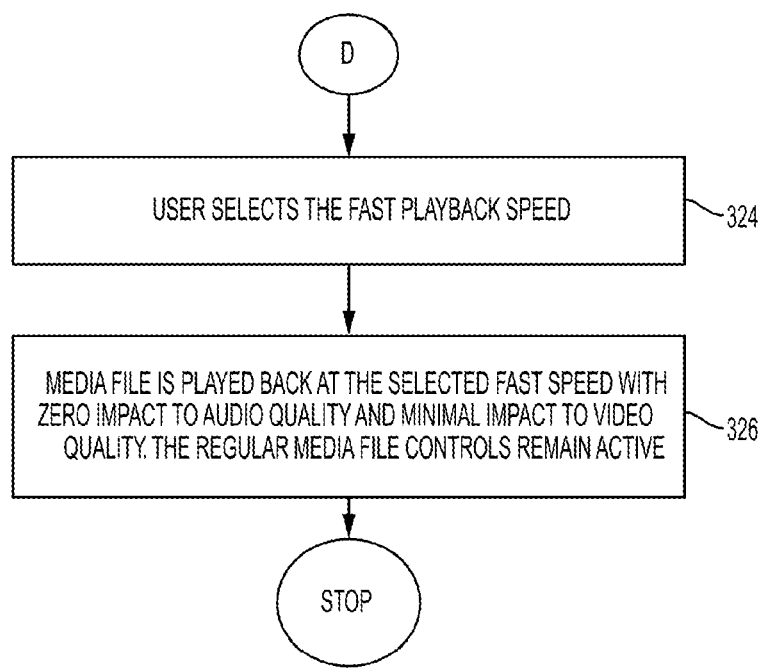
FIG. 2B is a continuation of the flowchart of FIG. 2A of a non-limiting illustrative embodiment of a method for fast playback.
Figure 3A:
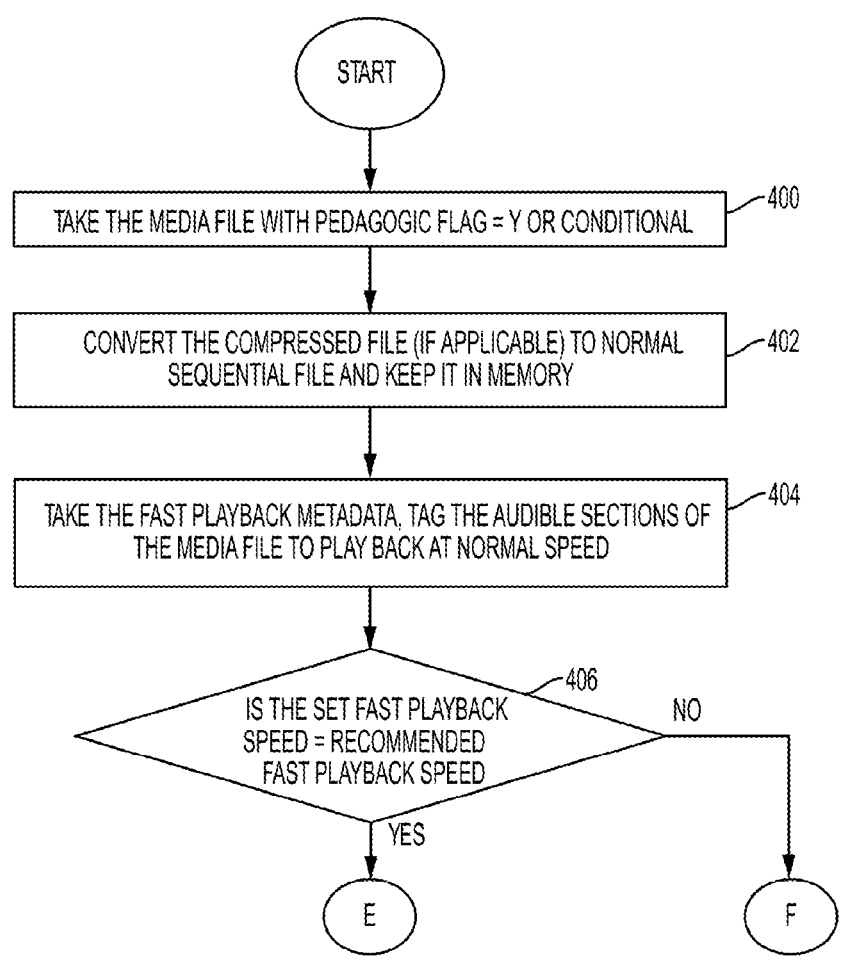
FIG. 3A is a flowchart of a non-limiting illustrative embodiment of a method for setting the fast playback speed.
Figure 3B:
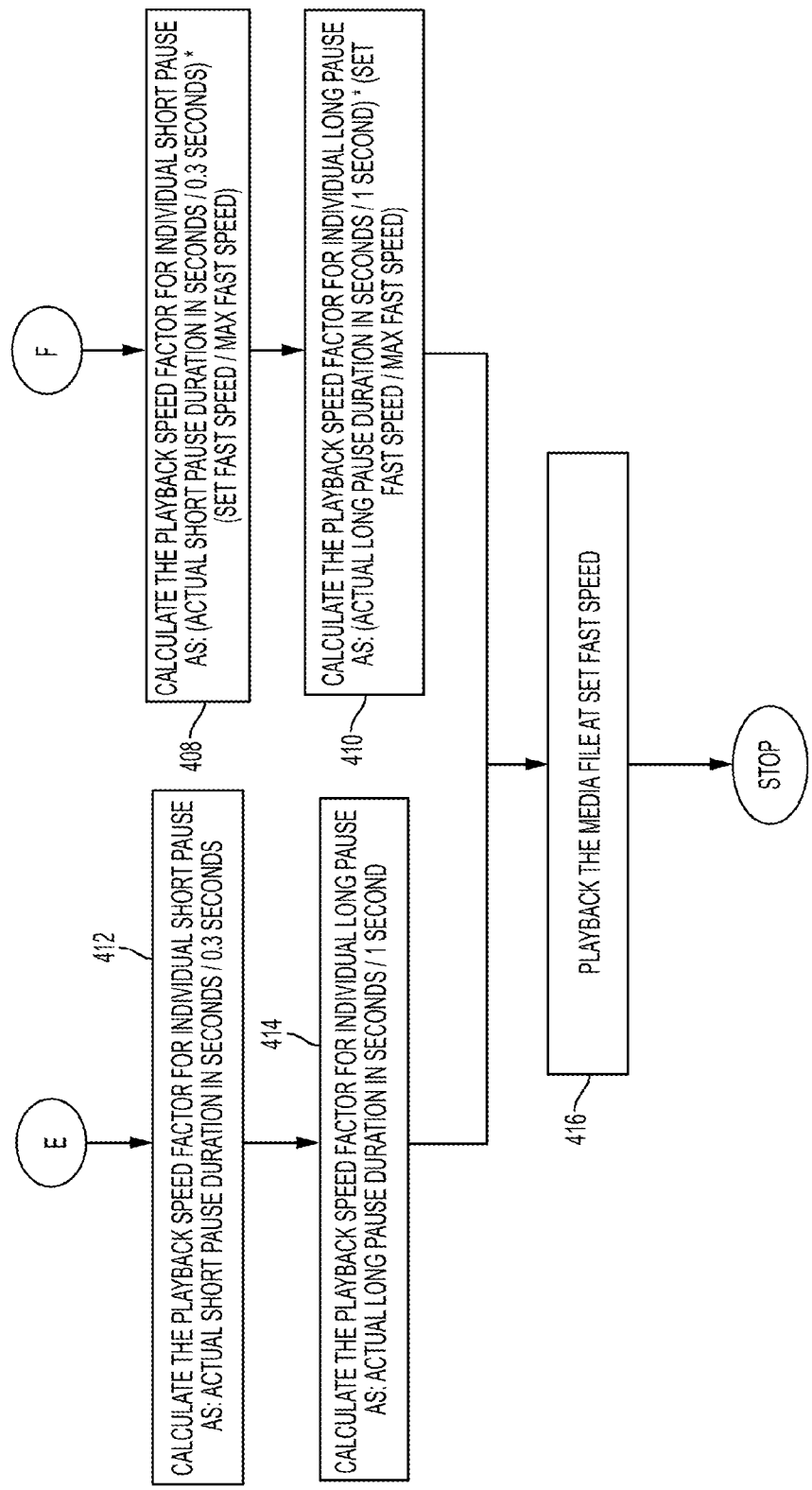
FIG. 3B is a continuation of the flowchart of FIG. 3A of a non-limiting illustrative embodiment of a method for setting the fast playback speed.

Referring now to FIGS. 2A-2B, there is shown a flowchart of a non-limiting illustrative embodiment of a method for fast playback. At step 300, the system attempts to play the media file. At step 302, the system then checks the pedagogic flag value. If there is a "NO" pedagogic flag value, at step 304, the system does not provide the additional faster playback option to the user. Then, at step 306, the media file is played with regular option controls.

If the pedagogic value at step 302 is "CONDITIONAL," the faster playback option is provided to the user at step 308. Thereafter, the user tries to use the faster playback option at step 310. Next, at step 312, the system displays a warning to the user that some of the video playback might become too fast. Then, at step 314, the user can choose to override warning. If the user does not override the warning, the system plays the media file with regular control options at step 316. If the user overrides the warning, the system displays the recommended fast playback speed and maximum fast playback speed calculated at the time of file creation, at step 322.

If the pedagogic flag value at step 302 is "YES," the additional faster playback option is provided to the user at step 318. Thereafter, at step 320, the user can try to utilize the faster playback option. Then, at step 322, the system displays the recommended fast playback speed and maximum fast playback speed calculated at the time of file creation.

Next, if the pedagogic flag is "YES" or "CONDITIONAL" and the user overrides the aforementioned warning, then, at step 324, the user can select the fast playback speed. Thereafter, at step 326, the media file is played back at the selected fast speed with zero impact to audio quality and minimal impact to video quality. The regular media file controls remains active.

Referring now to FIGS. 4A-4B, there is shown a diagram of a non-limiting illustrative embodiment of a method for fast playback. At step 400, a media file with a pedagogic flag labeled "YES" or "CONDITIONAL" is received. The system, at step 402, then converts the compressed file (if it is compressed) into a normal sequential file. The normal sequential file is then stored in the memory of the system. At step 404, fast playback metadata is taken and the audible sections of the medial file are tagged to play back at normal speed. Next, at step 406, the system determines if the set fast playback speed is equal to the recommended fast playback speed.

If they are not equal, at step 408 of FIG. 7, the system calculates the playback speed factor for individual short pauses as: (Actual Short Pause duration in seconds/0.3 seconds)*(Set Fast Speed/Maximum Fast Speed). Thereafter, at step 410, the system calculates the playback speed factor for individual long pauses as: (Actual Long Pause duration in seconds/1 second)*(Set Fast Speed/Maximum Fast Speed).

If they are equal, the system calculates the playback speed factor for individual short pauses, at step 412, as: (Actual Short Pause duration in seconds/0.3 seconds). Next, at step 414, the system calculates the playback speed factor for a long pause as: (Actual Long Pause duration in seconds/1 second). Finally, once the calculations have been made in either scenario, the system initiates playback the media file at set fast speed, at step 416.

Examples of calculated playback speed factors are shown in the table below.

TABLE 3

Exemplary Playback Speed Factors

| File | Start time | End Time | Total Speech Duration | Speed Factor |
|---|---|---|---|---|
| 11.mp3 | 3.8 | 10 | 6.2 | 1 |
| 22.mp3 | 3.45 | 8.95 | 5.5 | 1.127272727 |
| 33.mp3 | 3.4 | 6.7 | 3.3 | 1.878787879 |
| 44.mp3 | 2.65 | 4.5 | 1.85 | 3.351351351 |

Figure 5A:
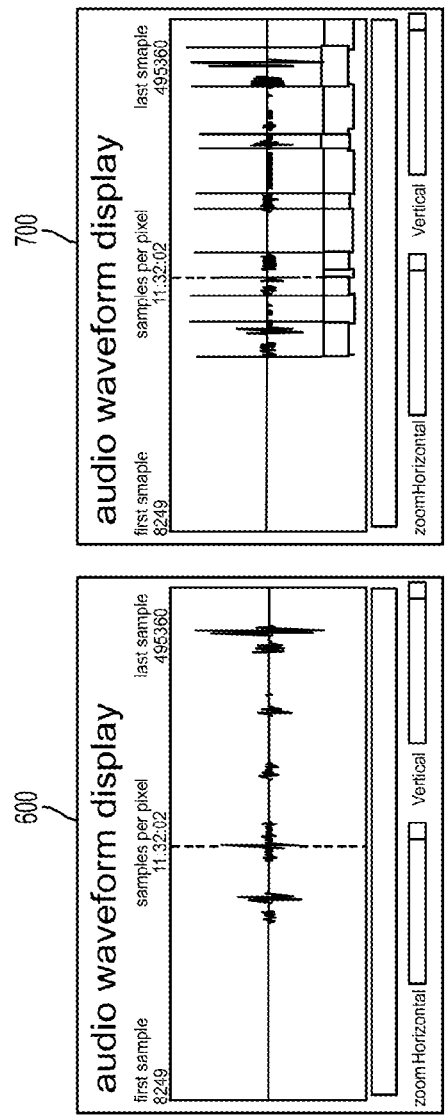
FIG. 5A depicts an example of audio waveform display of an audio file 11.mp3.
Figure 5B:
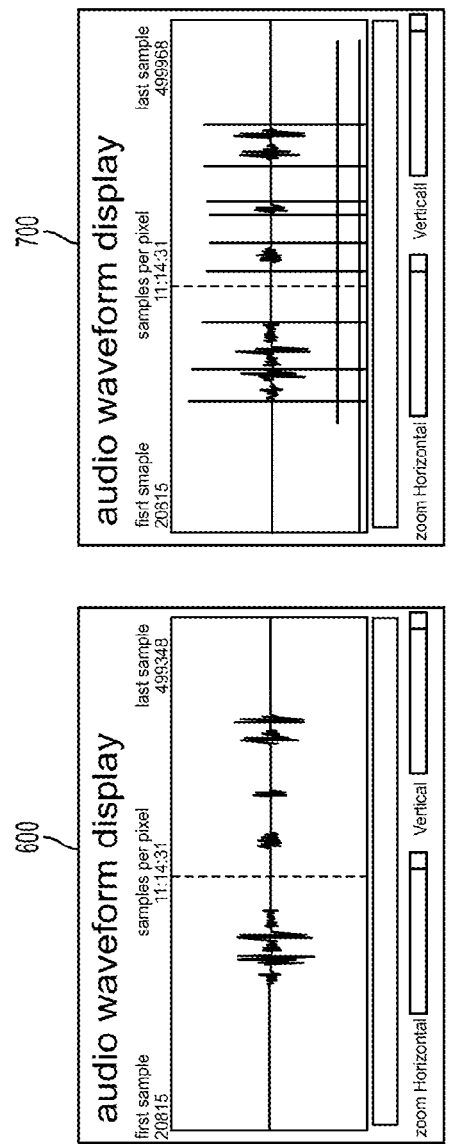
FIG. 5B depicts an example of an audio waveform display of an audio file 22.mp3.
Figure 5C:
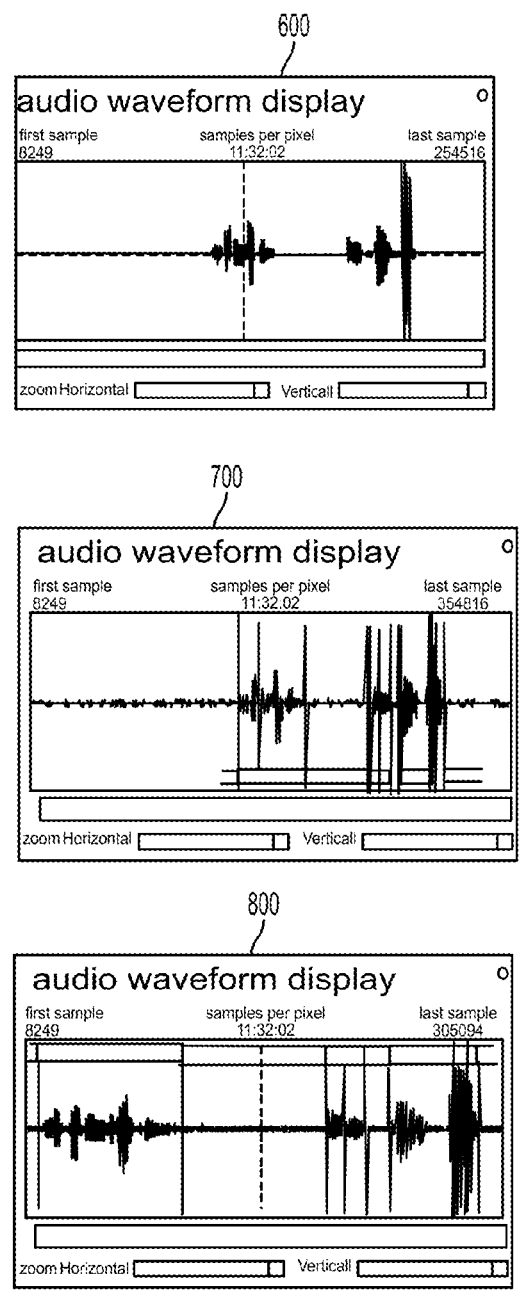
FIG. 5C depicts an example of an audio waveform display of an audio file 33.mp3.
Figure 5D:
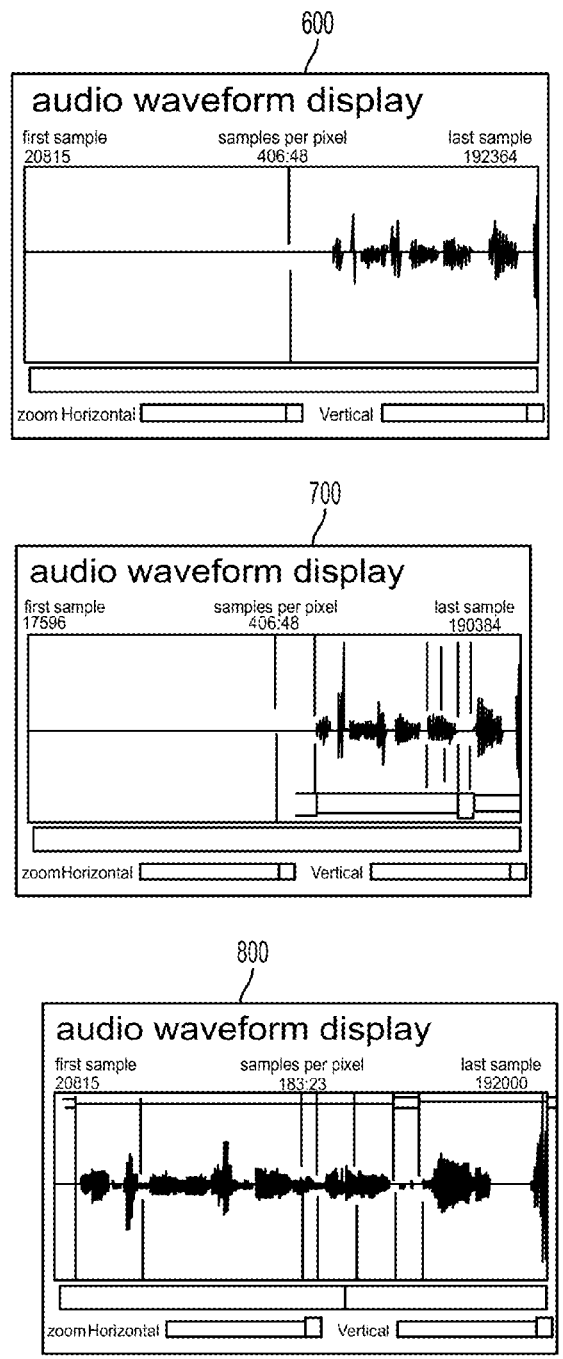
FIG. 5D depicts an example of an audio waveform display of an audio file 44.mp4.

Each of the playback speed factors in Table 1 corresponds to the audio files shown in FIG. 5A (11.mp3), FIG. 5B (22.mp3), FIG. 5C (33.mp3), FIG. 5D (44.mp3). For each audio file (11.mp3, 22.mp3, 33.mp3, and 44.mp3), the unaltered audio file is to the left, while the sectioned audio file is to the right. Each section or segment represents a silence, a pause between words, or a period of continuous words or speech.

In one embodiment, the individual pause playback speeds are calculated in such a manner so that the initial ratio between each and every pause duration in the original file is also maintained at the fast playback speed as well. For example, if there were four pauses of 0.5 second, 1 second, 2 seconds, and 3 seconds in the original file, and if the playback speed is set as 5×, then the pause lengths will become 0.1 second, 0.2 second, 0.4 second, and 0.6 second, respectively. In this situation, the original interplay of speech and pauses will also be visible at the fast playback speed, so the fast playback will sound truly like natural human speech. This embodiment is suitable for conversation-like situations.

In an alternative embodiment, the fast playback method can also be used to create a lossy compressed file. The created lossy compressed file would be smaller in size, but the spoken text quality is not affected. Only the speech pauses are trimmed from the file.

Figure 4:
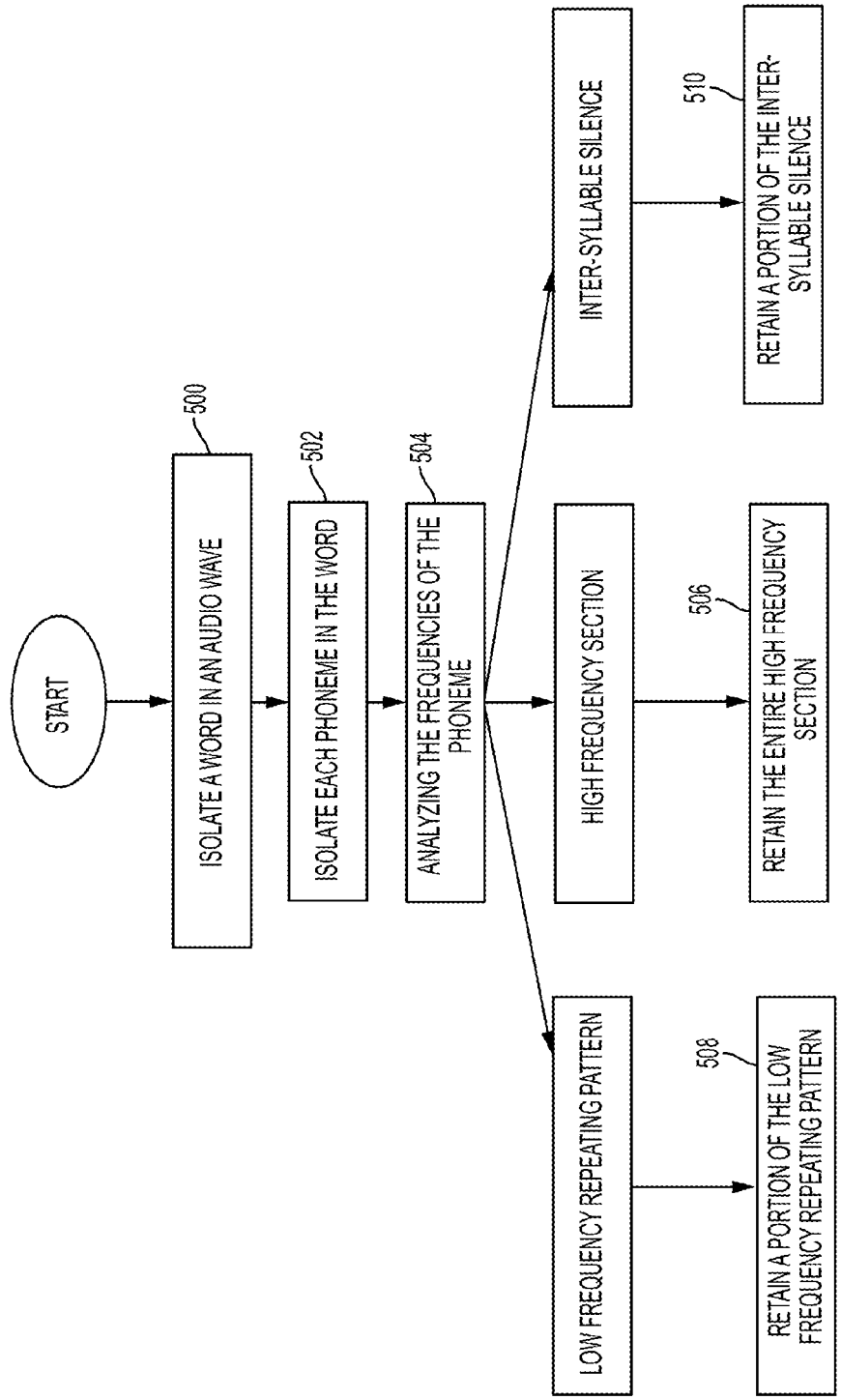
FIG. 4 is a flowchart of a non-limiting illustrative embodiment of a method for fast playback of spoken words in a media file.
Figure 6A:
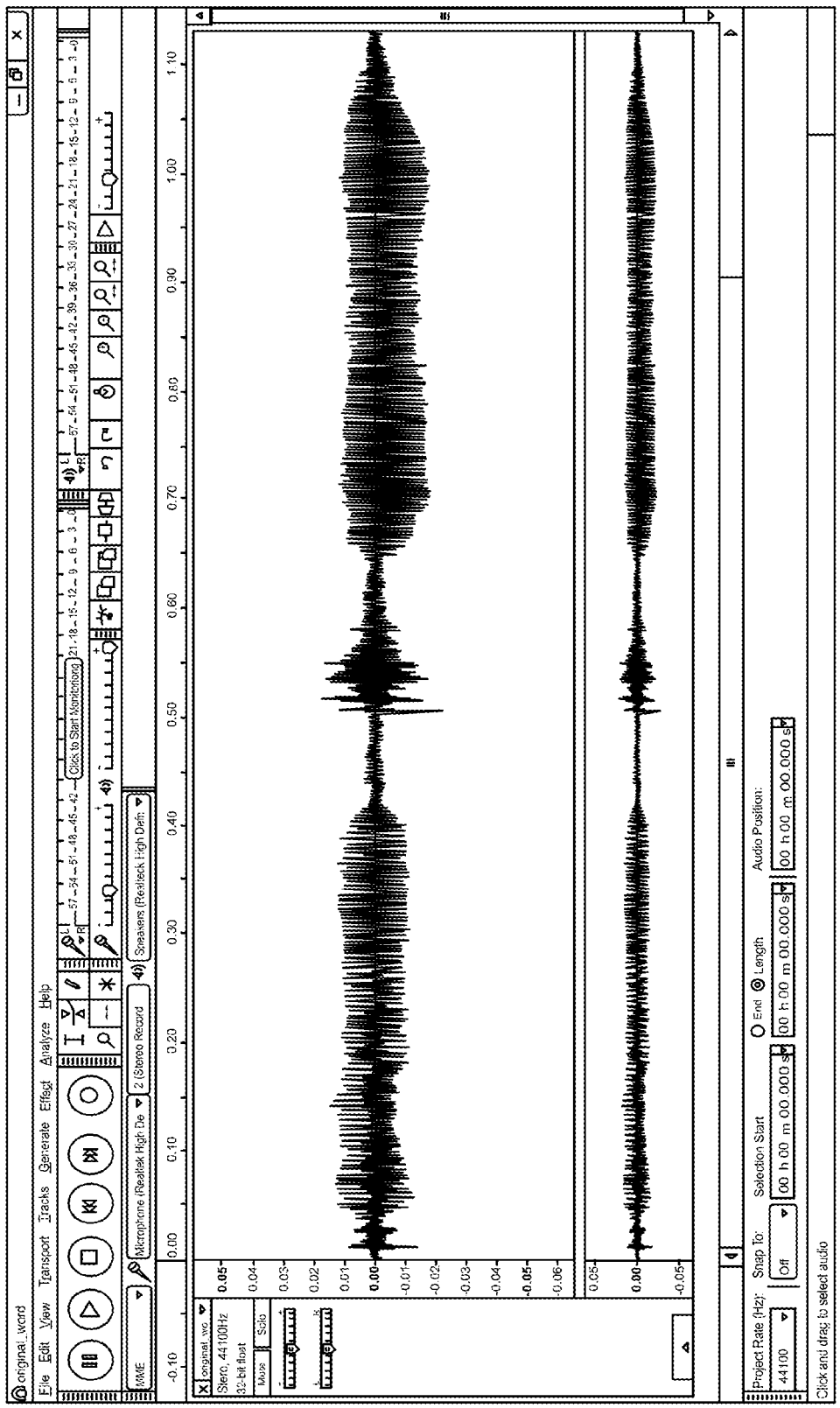
FIG. 6A depicts an embodiment of an audio wave of an original word sound file.

In another embodiment, shown in FIG. 4, the method to increase the speed of playback without a reduction in sound quality may also include method steps to increase the speed of actual spoken content. Through the method steps shown in FIG. 4, the speed of spoken words in a media file is increased without affecting the sound quality, or the syllables and phonemes that are already spoken quickly. At step 500, an audio wave is analyzed such that each spoken word in the audio wave is isolated. For example, an original word sound file has the duration of 1.1 seconds. The playback speed of this original word can be increased such that the duration is 0.49 seconds. In this example, the original word is "country" and its audio wave is shown in FIG. 6A.

Figure 6B:
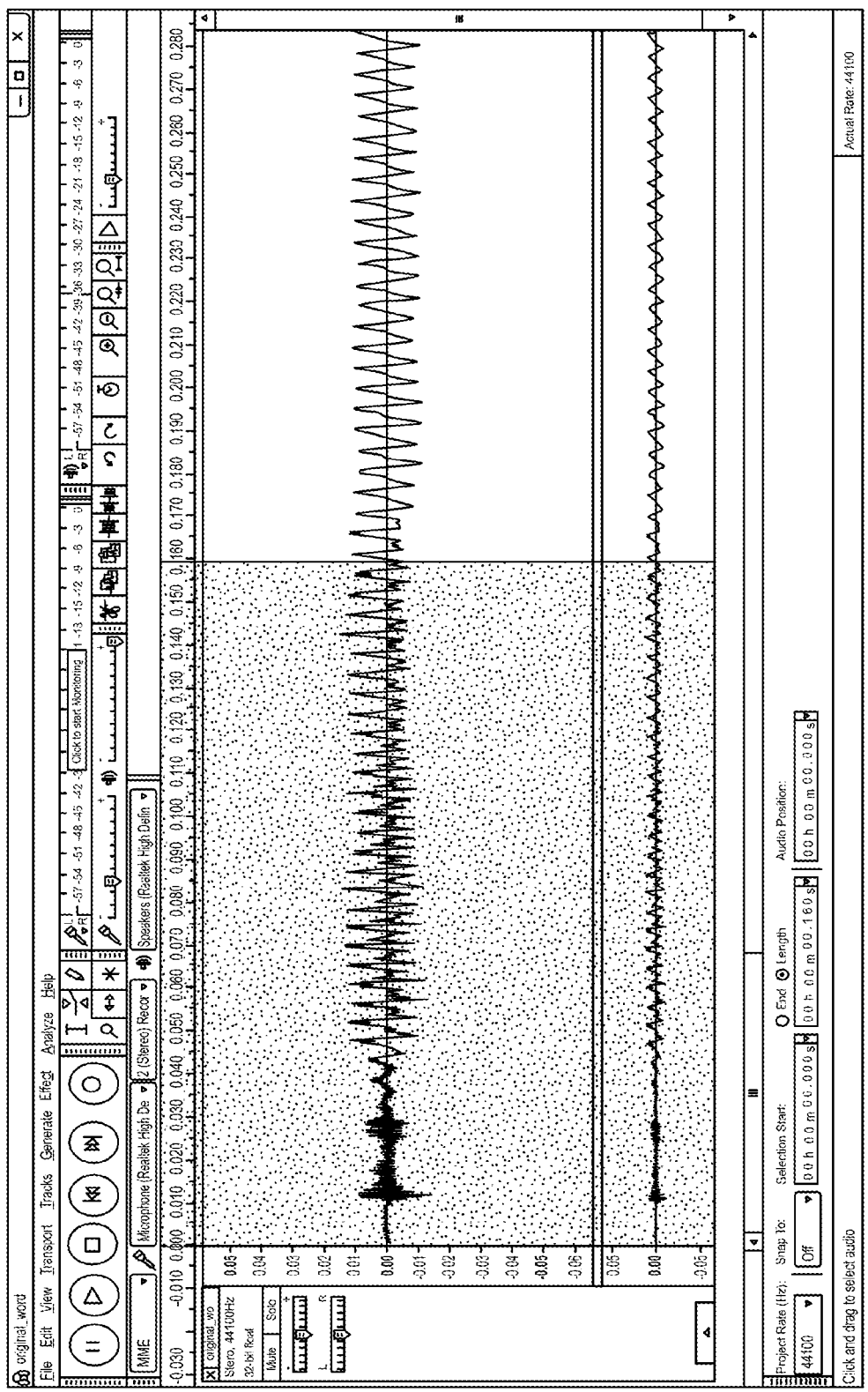
FIG. 6B provides an example of frequencies depicted in a magnified audio wave.

Next, at step 502, each phoneme in the word is isolated. Following the previous example, the phoneme "K" lasts from 0-0.100 seconds in the audio wave for "country." At step 504, the frequencies of the phoneme are analyzed. The "K" phoneme has a high frequency section (defined as frequencies higher than 500 Hz) from 0.010-0.040 seconds and one type of a repeating pattern at low frequency from 0.050-0.160 seconds. These frequencies are depicted in the magnified audio wave shown in FIG. 6B.

Figure 6C:
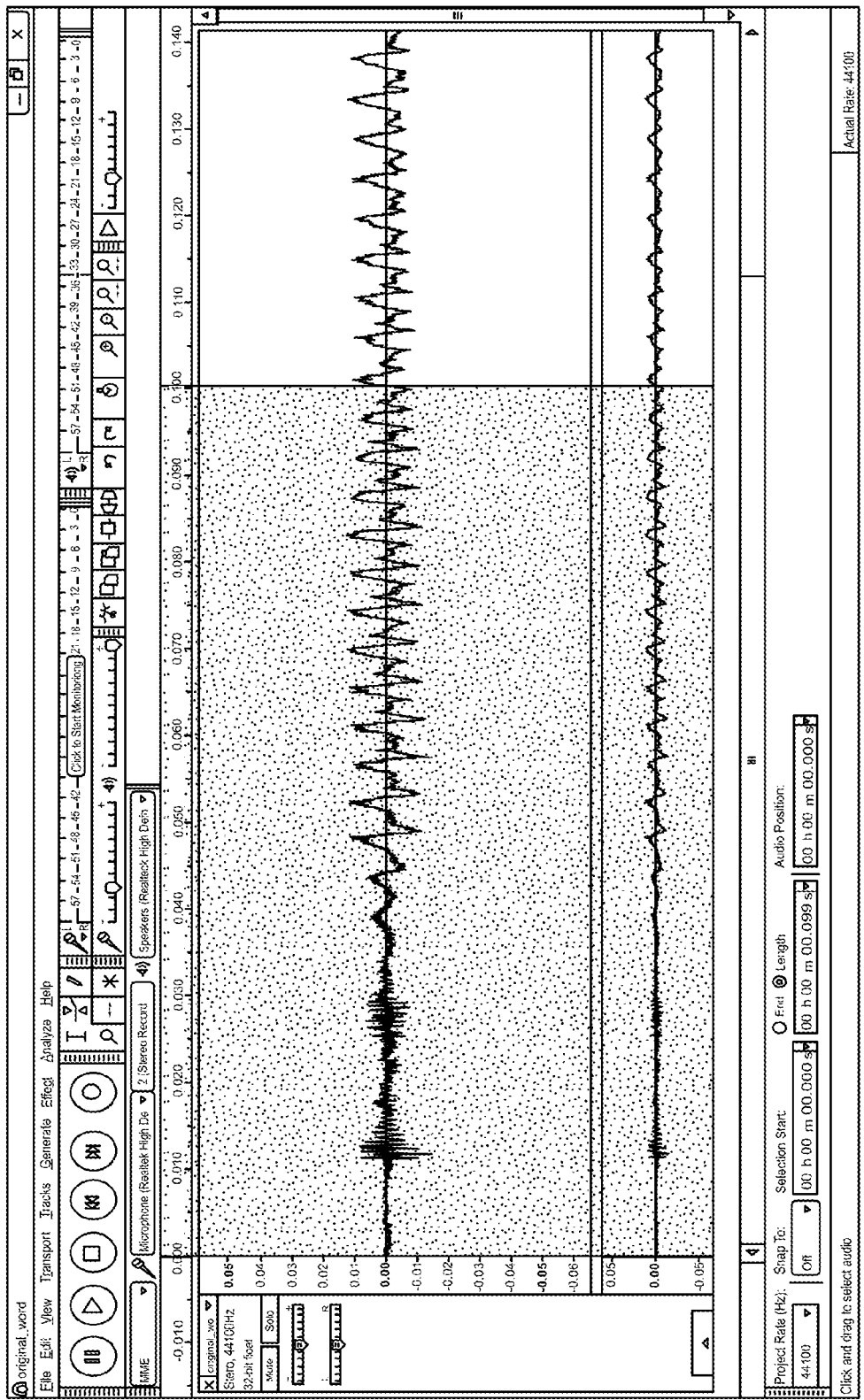
FIG. 6C depicts an embodiment of the audio wave of FIG. 6A wherein the length of the retained portion of a low frequency repeating pattern is at least 30-35 milliseconds.

After each phoneme of the original word in the audio wave is identified, the next step, step 506, is to retain any high frequency sections of the phoneme. Then, if the system determines there are low frequency repeating patterns, only a portion of the low frequency repeating pattern is retained at step 508. For example, the length of the retained portion of the low frequency repeating pattern is at least 30-35 milliseconds in the "country" example shown in FIG. 6C.

Figure 6D:
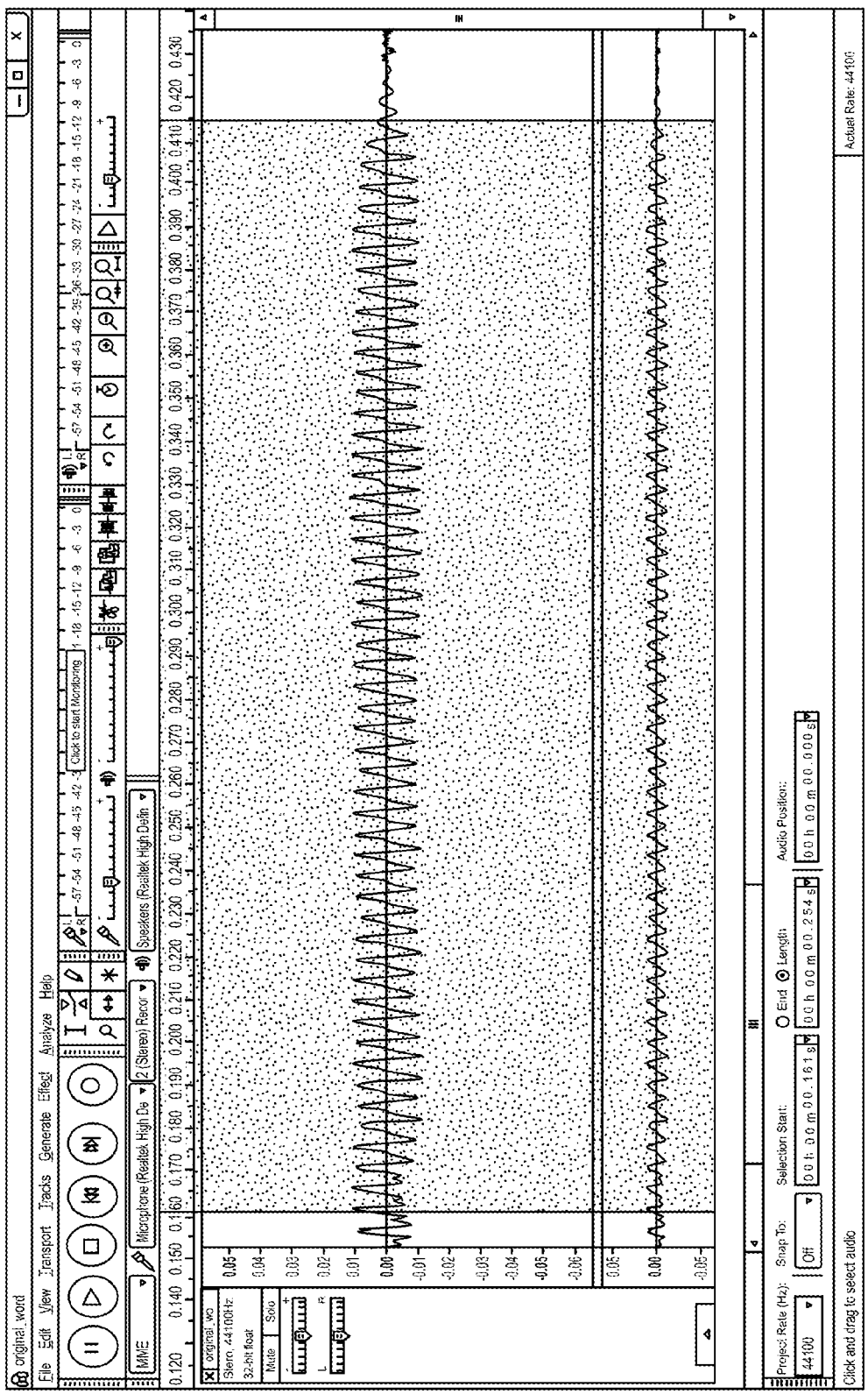
FIG. 6D depicts an embodiment of the audio wave of FIG. 6A, wherein the average low frequency repeating pattern from 0.50-0.100 seconds is repeated from 0.100-0.160 seconds, so the 0.100-0.160 section is skipped entirely or played back quickly. This method is repeated for the next phoneme, "n" in "country." Phoneme "n" is represented by another low frequency repeating pattern from 0.160-0.410 seconds.

The average low frequency repeating pattern from 0.50-0.100 seconds is repeated from 0.100-0.160 seconds, so the 0.100-0.160 section is skipped entirely or played back quickly. This method is repeated for the next phoneme, "n" in "country." Phoneme "n" is represented by another low frequency repeating pattern from 0.160-0.410 seconds, shown, in FIG. 6D, so 40 milliseconds of this repeating pattern is retained.

Figure 6E:
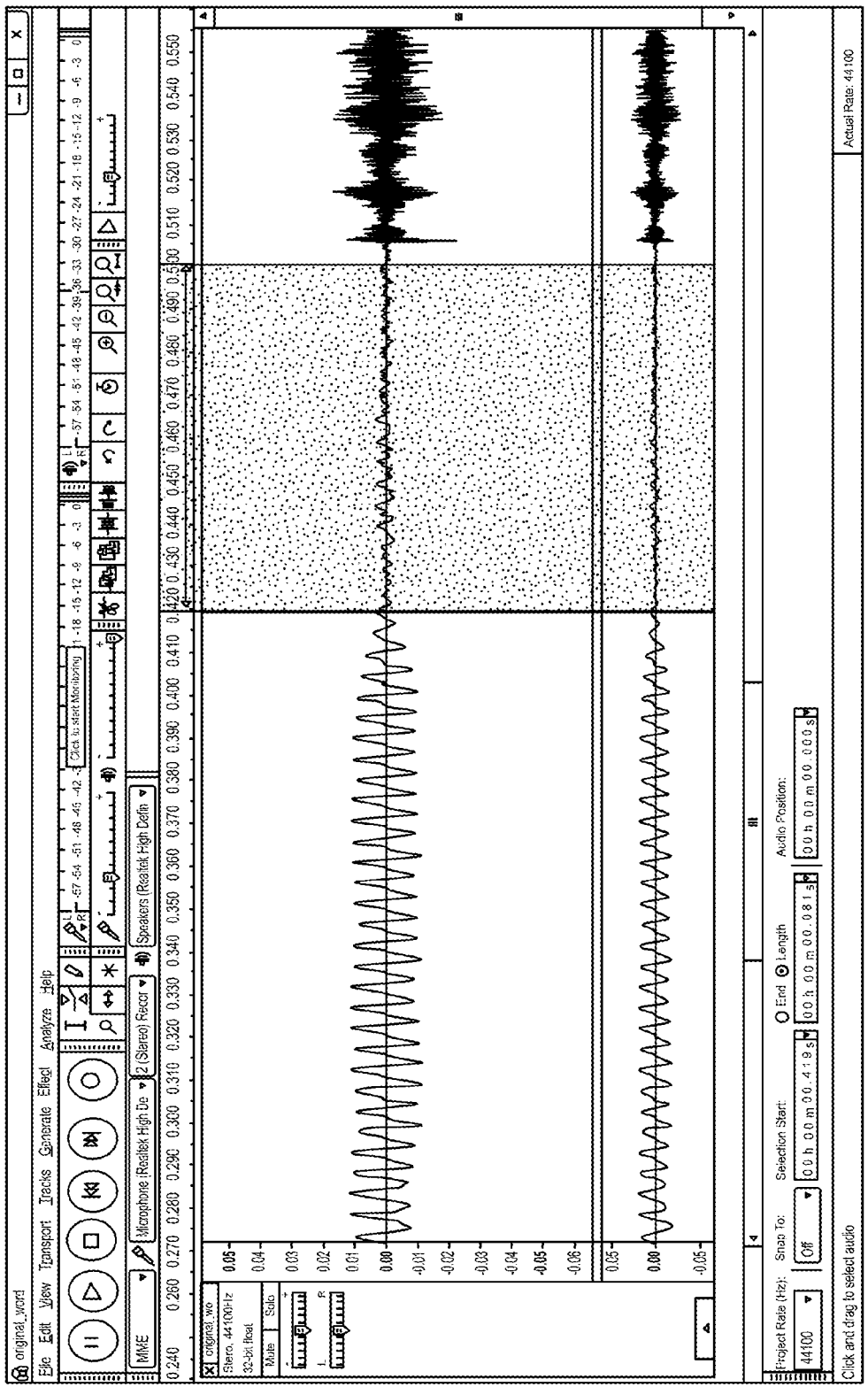
FIG. 6E depicts an embodiment of the audio wave of FIG. 6D, wherein for the "n" phoneme in "country," there is a 80 millisecond inter-syllable silence duration from 0.420-0.500 seconds, highlighted and 40 milliseconds of the inter-syllable silence is retained and 40 milliseconds are ignored.

Then, if there is an inter-syllable silence detected when analyzing the frequencies of the phoneme at step 504, only a portion of the inter-syllable silence is retained at step 510. For example, for the "n" phoneme in "country," there is a 80 millisecond inter-syllable silence duration from 0.420-0.500 seconds, highlighted in the FIG. 6E and 40 milliseconds of the inter-syllable silence is retained and 40 milliseconds are ignored.

This method is repeated for the remaining phonemes in the original spoken word. Table 2 below shows the time calculations for each phoneme after portions of low frequency repeating patterns and inter-syllable silences are ignored or played back quickly.

TABLE 4

Time Calculation for Each Phoneme in "Country"

| Type | Sound | Start | End | Total Length in Milliseconds |
|---|---|---|---|---|
| original word | country | 0 | 1110 | 1110 |
| phoneme | k | 0 | 100 | 100 |
| phoneme | n | 160 | 200 | 40 |
| phoneme | silence | 420 | 470 | 50 |
| phoneme | t | 500 | 644 | 144 |
| phoneme | ri | 644 | 800 | 156 |
| Total Phonemes Duration | | | | 490 |
| Speed Factor Achieved = 1110/490 = | 2.265306122 | | | |

As described and shown above, only a portion of patterns of low frequency and inter-syllable silences are retained and the remaining portion is ignored. Further, any small low frequency instances between patterns that are not part of any pattern sequences are also retained for continuity. In some embodiments, the retained portion of the low frequency patterns is adaptable to various languages and speakers. For example, a listener could be able to control the low frequency phoneme length through a user interface. The low frequency pattern phoneme length could be 35 milliseconds or up to 50 milliseconds. Finally, all high frequency (>500 Hz) instances are retained without change.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A computer program product providing increased playback speed of audio files, the computer program comprising a computer readable storage medium having program instructions embodied therewith, wherein the computer readable storage medium is not a transitory signal per se, the program instructions are readable by a computer to cause the computer to perform a method comprising the steps of:
identifying a pedagogic media file;
adding a flag to metadata of the pedagogic media file;
wherein the flag is representative of pauses in the pedagogic media file; and
providing one or more new playback speeds based at least in part on the flag, wherein the one or more new playback speeds are at least one of a maximum fast playback speed and a recommended fast playback speed, said recommended fast playback speed is calculated as an Original Length/New Length, wherein the New Length=Original File Length−Σ(short pause durations>0.3 seconds−0.3 seconds)−Σ(long pause durations>1 second−1 second).

2. The method of claim 1, further comprising the step providing user playback speed control when the flag of the pedagogic media file is conditional.

3. The method of claim 1, wherein the maximum fast playback speed is calculated as Original Length/New Length, wherein New Length=Original File Length−Σ(short pause durations−0.1 seconds)−Σ(long pause duration−0.5 seconds).

4. The method of claim 1, further comprising the step of detecting a short pause in the pedagogic media file.

5. The method of claim 1, further comprising the step of detecting a long pause in the pedagogic media file.

6. The method of claim 1, further comprising the step of playing back the pedagogic media file at the new playback speed.

7. The method of claim 1, wherein the new playback speeds comprises spoken sections at an original speed and silent sections at a fast forwarded speed.

* * * * *